United States Patent
Oleynik et al.

(10) Patent No.: US 8,378,509 B2
(45) Date of Patent: *Feb. 19, 2013

(54) MULTIPHASE MATERIAL GENERATOR VEHICLE

(75) Inventors: Vladislav Oleynik, Pittsboro, NC (US); Melvin Jason Ezell, Buies Creek, NC (US); Jeffrey L. Riggs, Pittsboro, NC (US); Gennadiy Albul, Pittsboro, NC (US)

(73) Assignee: CAUSwave, Inc., Pittsboro, NC (US)

( * ) Notice: Subject to any disclaimer, the term of this patent is extended or adjusted under 35 U.S.C. 154(b) by 350 days.

This patent is subject to a terminal disclaimer.

(21) Appl. No.: 12/938,971

(22) Filed: Nov. 3, 2010

(65) Prior Publication Data

US 2011/0101703 A1     May 5, 2011

Related U.S. Application Data

(60) Provisional application No. 61/257,716, filed on Nov. 3, 2009.

(51) Int. Cl.
    *F03G 7/00*     (2006.01)
(52) U.S. Cl. ........................................ 290/1 R
(58) Field of Classification Search .............. 290/1 R
See application file for complete search history.

(56) References Cited

U.S. PATENT DOCUMENTS

| | | | |
|---|---|---|---|
| 421,306 A | 2/1890 | Reynolds | |
| 2,753,801 A | 7/1956 | Cummings | |
| 2,879,955 A | 3/1959 | Von Zborowski | |
| 2,927,398 A | 3/1960 | Kaye et al. | |
| 2,960,033 A | 11/1960 | Jackson | |
| 3,031,932 A | 5/1962 | Fite, Jr. | |
| 3,049,832 A | 8/1962 | Joffe | |
| 3,082,666 A | 3/1963 | Fitzpatrick et al. | |
| 3,135,163 A | 6/1964 | Mechlin, Jr. et al. | |
| 3,158,100 A | 11/1964 | Finley | |
| 3,167,016 A | 1/1965 | Czerwinski et al. | |
| 3,198,073 A | 8/1965 | Van Tine et al. | |
| 3,252,281 A | 5/1966 | Everett et al. | |
| 3,253,511 A | 5/1966 | Zwicky | |
| 3,313,207 A | 4/1967 | Biehl et al. | |
| 3,323,531 A | 6/1967 | Spellman | |
| 3,353,823 A | 11/1967 | Sobel | |
| 3,369,455 A | 2/1968 | Jones | |
| 3,397,638 A | 8/1968 | Gould | |
| 3,422,808 A | 1/1969 | Weinberg et al. | |
| 3,428,022 A | 2/1969 | Ledley | |

(Continued)

FOREIGN PATENT DOCUMENTS

| | | |
|---|---|---|
| EP | 0559547 A1 | 9/1993 |
| GB | 2058302 A | 4/1981 |

(Continued)

OTHER PUBLICATIONS

International Preliminary Report on Patentability; Dec. 16, 2010, issued in International Patent Application No. PCT/US2009/045936.

(Continued)

*Primary Examiner* — Tho D Ta
(74) *Attorney, Agent, or Firm* — Nelson Mullins Riley & Scarborough LLP; R. Brian Drozd

(57) ABSTRACT

Systems and methods are disclosed relating to a vehicle driven by an air driven generator that employs multiphase materials and compressed air.

26 Claims, 9 Drawing Sheets

U.S. PATENT DOCUMENTS

| | | | |
|---|---|---|---|
| 3,620,123 A | 11/1971 | Davidsson et al. | |
| 3,633,560 A | 1/1972 | DeFreitas | |
| 3,715,983 A | 2/1973 | Rosinski | |
| 3,842,598 A | 10/1974 | Forsten | |
| 3,916,794 A | 11/1975 | Mayer | |
| 4,185,538 A | 1/1980 | Barakauskas | |
| 4,333,402 A | 6/1982 | Landstrom et al. | |
| 4,444,085 A | 4/1984 | Dragonuk | |
| 4,455,917 A | 6/1984 | Shook | |
| 4,584,925 A | 4/1986 | Culotta et al. | |
| 4,682,559 A | 7/1987 | Schnitzer et al. | |
| 4,784,035 A | 11/1988 | Fishfader et al. | |
| 4,932,306 A | 6/1990 | Rom | |
| 5,015,211 A | 5/1991 | Reveen | |
| 5,063,826 A | 11/1991 | Bulman | |
| 5,081,862 A | 1/1992 | Merten, Jr. | |
| 5,097,743 A | 3/1992 | Hertzberg et al. | |
| 5,099,645 A | 3/1992 | Schuler et al. | |
| 5,149,290 A | 9/1992 | Reveen | |
| 5,170,005 A | 12/1992 | Mabry et al. | |
| 5,174,384 A | 12/1992 | Herman | |
| 5,355,764 A | 10/1994 | Marinos et al. | |
| 5,584,736 A | 12/1996 | Salvemini | |
| 5,623,113 A | 4/1997 | Valembois | |
| 5,833,393 A | 11/1998 | Carnahan et al. | |
| 5,847,307 A | 12/1998 | Kennedy et al. | |
| 5,864,517 A | 1/1999 | Hinkey et al. | |
| 5,927,329 A | 7/1999 | Yie | |
| 5,964,985 A | 10/1999 | Wootten | |
| 5,993,921 A | 11/1999 | Hunn | |
| 6,124,563 A | 9/2000 | Witherspoon et al. | |
| 6,138,766 A | 10/2000 | Finnerty et al. | |
| 6,142,055 A | 11/2000 | Borgwarth et al. | |
| 6,225,705 B1 | 5/2001 | Nakamats | |
| 6,257,340 B1 | 7/2001 | Vician | |
| 6,276,354 B1 | 8/2001 | Dillon | |
| 6,352,030 B1 | 3/2002 | Doll et al. | |
| 6,427,574 B1 | 8/2002 | Callahan | |
| 6,550,074 B1 | 4/2003 | Allenbaugh et al. | |
| 6,752,060 B1 | 6/2004 | Griffin | |
| 7,182,014 B2 | 2/2007 | Smith | |
| 7,267,230 B1 | 9/2007 | Smith | |
| 7,313,881 B1 | 1/2008 | Gieseke et al. | |
| 7,317,662 B2 | 1/2008 | Unsworth et al. | |
| 7,617,818 B1 | 11/2009 | Turchik et al. | |
| 7,637,203 B2 | 12/2009 | Moss | |
| 7,685,920 B2 | 3/2010 | Paul | |
| 7,775,148 B1 | 8/2010 | McDermott | |
| 8,181,561 B2 * | 5/2012 | Riggs et al. | 89/1.817 |
| 8,294,287 B2 * | 10/2012 | Oleynik et al. | 290/1 R |
| 2001/0032638 A1 | 10/2001 | Yoshimura | |
| 2002/0096041 A1 | 7/2002 | Briggs et al. | |
| 2004/0007123 A1 | 1/2004 | Ritchie et al. | |
| 2004/0074381 A1 | 4/2004 | Smith | |
| 2005/0139363 A1 | 6/2005 | Thomas | |
| 2006/0090635 A1 | 5/2006 | Paul | |
| 2006/0096449 A1 | 5/2006 | Williams et al. | |
| 2006/0225716 A1 | 10/2006 | Lapointe | |
| 2007/0144506 A1 | 6/2007 | Sun et al. | |
| 2007/0251120 A1 | 11/2007 | Connell | |
| 2009/0255432 A1 | 10/2009 | Zhang et al. | |
| 2010/0166576 A1 * | 7/2010 | Leonard et al. | 417/410.1 |
| 2010/0326749 A1 * | 12/2010 | Mensah | 180/65.31 |
| 2011/0285134 A1 * | 11/2011 | Ortiz et al. | 290/52 |

FOREIGN PATENT DOCUMENTS

| | | | |
|---|---|---|---|
| JP | 2000-130991 A | 5/2000 | |
| JP | 2002316067 A | 10/2002 | |
| JP | 2004274942 A | 9/2004 | |
| KR | 20-0279401 Y1 | 6/2002 | |
| KR | 10-2002-0084499 A | 11/2002 | |
| KR | 100772493 B1 | 11/2007 | |
| RU | 2063572 C1 | 7/1996 | |
| RU | 2084260 C1 | 7/1997 | |
| SU | 397794 A | 2/1974 | |
| WO | 80-00237 A1 | 2/1980 | |

OTHER PUBLICATIONS

V.P. Korobeinikov (Propagation of shock and detonation waves in dust-laden gases, Journal: Fluid Dynamics, Publisher: MAIK Nauka/Interperiodica distributed exclusively by Springer Science+Business Media, LLC., ISSN: 0015-4628 (Print) 1573-8507 (Online); Issue vol. 19, No. 6/Nov. 1984; pp. 938-943.

Approximate calculation of throwing a massive body without packing by a two-phase flow Sadin, D.V.1.; Skylar, V.A. 1 Fizika Goreniya i Vzryva, v 34, n 3, p. 117-120, May-Jun. 1998.

Throwing of a noncompacted massive body by the two-phase medium flow skylar, V.A.1, Fizika Goreniya i Vzryva, v 32, n 3, p. 119-121, May-Jun. 1996.

Influence of channel recoil on the velocity of throwing of a massive solid body by a two-phase torrent of the bulk density Skylar, V.A.1, Fizika Goreniya i Vzryva, v 32, n 6, p. 129-133.

International Search Report; Jun. 16, 2010; issued in the International Patent Application No. PCT/US209/63173.

Written Opinion of the International Searching Authority; Jun. 16, 2010; issued in International Patent Application No. PCT/US09/63173.

International Search Report and Written Opinion, issued Jun. 27, 2011, for PCT/US2010/055295, Korean International Search Authority.

Alfer'ev, K.V. et al., Mechanics of Autonomous Gas-Dynamic Torpedo Motion in Loose Medium, Journal of Mining Science, 2002, pp. 324-328, vol. 38, No. 4.

Borovikov, V.V., Development of a Containment Cavity in a Layer of Free-Flowing Material in Gaseodynamic Outburst from a Subsurface Gas Source, Journal of Mining Science, 1997, pp. 41-46, vol. 33, No. 1.

Borovikov, V.V. et al., Dynamics of a Soil Mass Subjected to a Deep Source of Gaseous Energy, Journal of Mining Science, 1995, pp. 51-55, vol. 31, No. 1.

Alfer'ev, K.V. et al.; The Effect of Rigid Boundaries on the Directionality of an Excavating Explosion; Combustion, Exposion, and Shock Waves; 2001; pp. 613-615: vol. 37, No. 5.

Borovikov, V.V. et al., Analysis of Energy Expenditures of Cold Gas on Ejection, Journal of Mining Science, 1995, pp. 364-365, vol. 31, No. 5.

Borovikov, V.V., Numerical Modeling of Gaseodynamic Processes in the Atmosphere Occurring with Detonation of a Vertical Deep-Hole Charge, Journal of Mining Science, 1995, pp. 427-432, vol. 31, No. 6.

Borovikov, V.V., Evaluation of Intensity of Loading in a Mass of Loose Material in the Zone of Action of an Underground Gaseodynamic Discharge, Journal of Mining Science, 1995, pp. 416-420, vol. 31, No. 6.

Borovikov, V.V., Numerical Modeling of the Magnitude of the Load on a Mass of Free-Flowing Material Subjected to the Action of a Gaseodynamic Source, Journal of Mining Science, 1997, pp. 348-355, vol. 33, No. 4.

Borovikov, V.V., Numerical Studies of Transportation of Granular Material by a Pin-Point Blast Using Models of the Mechanics of Continuous and Granular Media, Journal of Applied Mechanics and Technical Physics, 1998, pp. 1-11, vol. 39, No. 1.

Borovikov, V.V. et al., Gas-Dynamic Method of Decreasing the Force of Penetration of a Solid Into Ground, Journal of Applied Mechanics and Technical Physics, 1999, pp. 531-534, vol. 4, No. 3.

Borovikov, V.V. et al., Efficiency of Pulse Gas-Dynamic Technique of Pneumatic Transportation of Friable Materials, Journal of Mining Science, 1996, pp. 54-57, vol. 32, No. 1.

Borovikov, V.V et al.; The Use of Wave Effects of Pinpoint Underground Explosion; Combustion, Explosion, and Shock Waves; 2000; pp. 414-416; vol. 36, No. 3.

Borovikov V. Numerical investigations of transportation of loose material by directed explosion on the basis of models of solid and loose media mechanics. AMTP.—1998.—No. 1

Borovikov V, Alferiev K, Lubarski S. Influence of rigid boundaries on directivity of outburst explosion. CESW, v.37, No. 5, 2001.

Borovikov V. Numerical modeling of intensity of loading of loose material body under the influence of the gas dynamical source. JMS.—1997.—No 4.

Borovikov V. Development of camouflet space in the loose material layer at gas dynamical outburst out of an underground gas source. JMS.—1997.—No. 1.

Borovikov V, Alferiev K, Ebel A. Mechanics of movement of a pulse gas dynamical torpedo in loose medium. JMS.—No. 4, 2002.

Borovikov V, Guskov V, Sokolov A. Utilization of wave effects on directional explosions in ground. CESW, No. 3, 2000.

Borovikov V, Bystrov A. Pulse gas dynamical method of reducing the force of penetration of solid bodies into the ground. AMTP.—1999.—v.40.—No. 3.

Borovikov V, Ivanov A, Lubarski S, Pivak B. The efficiency of pulsed gas-dynamic method for transportation of granular materials. JMS.—1996.—No. 1.

Borovikov V. Numerical investigations of the shift of loose material by directed explosion on the basis of models of solid and loose media mechanics. AMTP.—1996.—No. 1.

Borovikov V. Evaluation of intensity of gas filtration out of the camouflet space at underground gas dynamical outburst. CESW.—1996.—v.32.—No. 4.

Borovikov V. Numerical modeling of gas dynamical processes in atmosphere during the explosion of vertical well charge. JMS.—1995.—No. 6.

Borovikov V. Evaluation of the intensity of loading the loose material body in the influence zone of underground gas dynamical obstruct. JMS.—1995.—No. 6.

Borovikov V, Ivanov A, Gorbunkov A, Lubarski S. Analysis of energy consumption of a cool gas for performance of outburst work. JMS.—1995.—No. 5.

Borovikov V, Ivanov A, Pivak B. Pulse gas dynamical method of transportation of loose materials. JMS.—1995.—No. 3.

Borovikov V, Ivanov A, Lubarski S, Pivak B. Evaluation of energy consumption during gas dynamics outburst in a layer of loose material. JMS.—1995.—No. 3.

Borovikov V, Ivanov A, Lubarski S. Dynamics of the ground body under the influence of underground gas energy source. JMS.—1995.—No. 1.

Borovikov V, Ivanov A, Lubarski S, Pivak B. Modeling of intensive gas delivery into the ground layer under the conditions of confined space. JMS.—1994.—No. 5.

Borovikov V, Ivanov A, Lubarski S, Sklar V. Method of filling of worked out space. JMS.—1993.—No. 6.

Borovikov V, Ivanov A, Lubarski S, Sklar V, Hurs S. Dense filling of worked out space with waste rock with application of the compressed gas energy. JMS.—1992.—No. 1.

Borovikov V, Ivanov A, Hurs S. On the influence of the intensity of gas delivery under a ground layer on pressure in the pit cavity. JMS.—1991.—No. 6.

Borovikov V, Ivanov A. On the influence of the intensity of gas delivery under a ground layer on the results of joint action of gas sources. CESW.—1991.—No. 4.

Borovikov V, Ivanov A, Lubarski S, Hurs S. Investigation of gas dynamical influence on a ground layer at various intensity of gas delivery. JMS.—1991.—No. 1.

Borovikov V. Construction mechanic of ground equipment of missile complexes. Textbook. Russian's Ministry of Defense. 2001.

Borovikov V. Hydraulic system of rocket servicing unit. Mozhaisky Military Space Academy (MSA). 1998.

Borovikov V. "Rokot" missile installation equipment. Mozhaisky MSA. 1998.

Borovikov V. Collection of problems for test papers on structural mechanics of launching installations. Mozhaisky MSA. 1999.

Borovikov V. Mounting unit for space rocket "Cyklon". Mozhaisky MSA. 1999.

Borovikov V. Main notions and definitions of structural mechanics of above-ground equipment for missile installations. Mozhaisky MSA. 1999.

Borovikov V. Cable-mast for space rocket "Soyuz". Mozhaisky MSA. 2000.

Borovikov V. Manual for practical work in laboratory on structural mechanics of launching installations. Mozhaisky MSA. 2000.

Borovikov V. Structural mechanics of above-ground equipment of missile installations. Mozhaisky MSA. 2001.

* cited by examiner

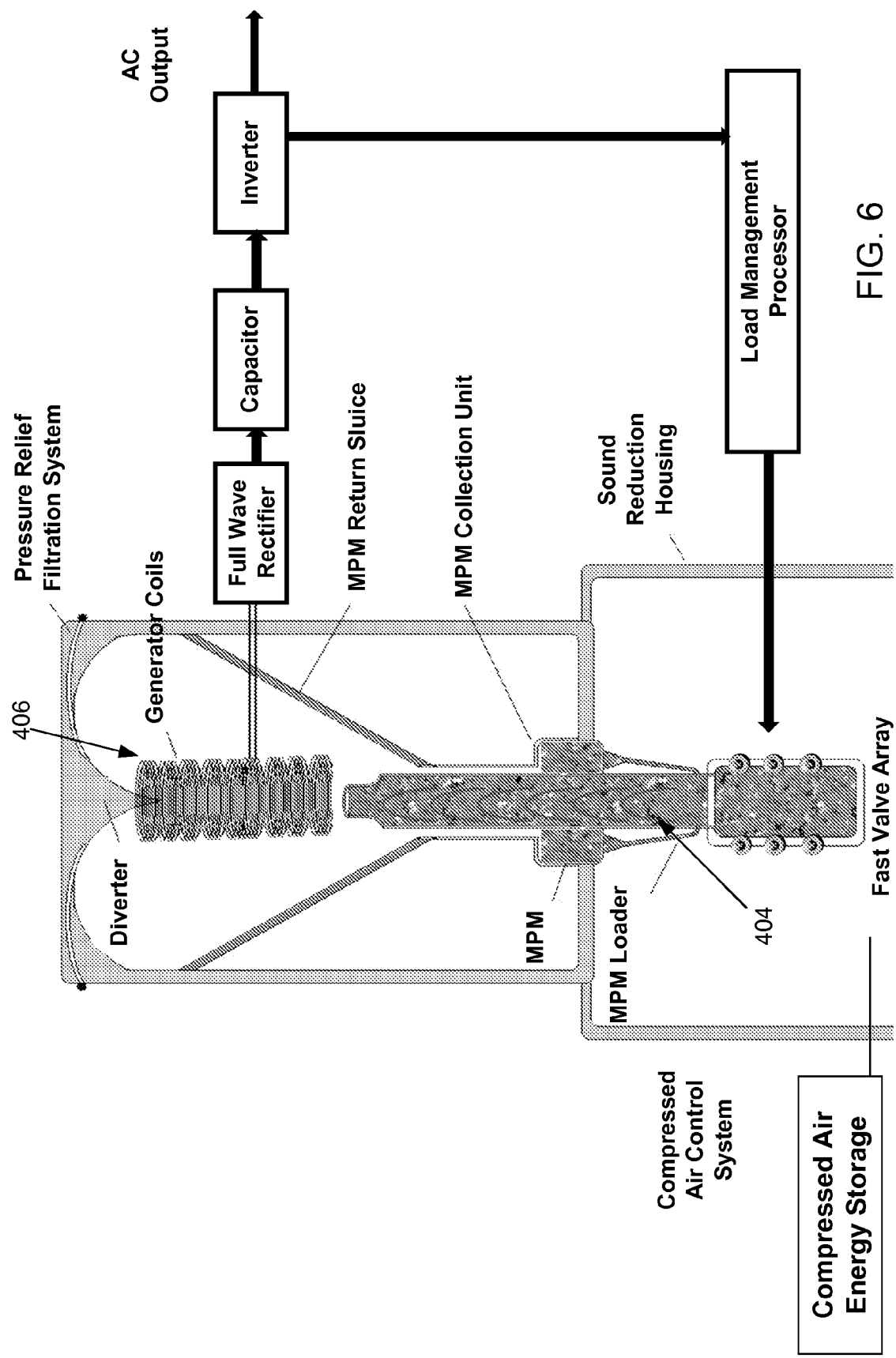

MULTIPHASE MATERIAL GENERATOR VEHICLE

CROSS-REFERENCE TO RELATED APPLICATION

This application claims priority from provisional patent application having Ser. No. 61/257,716 and filed Nov. 3, 2009, the entire disclosure of which is incorporated herein by reference.

BACKGROUND

Embodiments of the present disclosure relate to air-driven vehicles and more particularly pertains to a multiphase material generator system for generating electricity to propel a vehicle.

Currently, in the field of vehicles, it has been the general practice to employ a fuel source to propel the vehicle. Such devices have generally proven to be unsatisfactory in operation due to the gross inefficiency associated therewith. Specifically, the tremendous weight involved in the construction of these vehicles, as well as the large amount of fuel required to propel these vehicles even for a short distance, has made the construction of the same an impractical matter. Many of the problems associated with vehicles have revolved around the fact that fuel is a scarce resource and combustion thereof creates environmentally harmful fumes.

Thus, there is a need to develop systems and methods to propel vehicles efficiently, effectively and in an environmentally-safe manner.

BRIEF SUMMARY

In accordance with an embodiment of the present disclosure, a system for propelling a vehicle includes a generator, where the generator captures electrical energy and transfers the electrical energy to a motor in at least one wheel.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

FIG. 4B is another example of a generator in accordance with some aspects.

FIG. 6 is another example of a generator in accordance with some aspects.

DETAILED DESCRIPTION

The following detailed description of embodiments refers to the accompanying drawings, which illustrate specific embodiments of the disclosure. Other embodiments having different structures and operations do not depart from the scope of the present disclosure.

Figure 1:
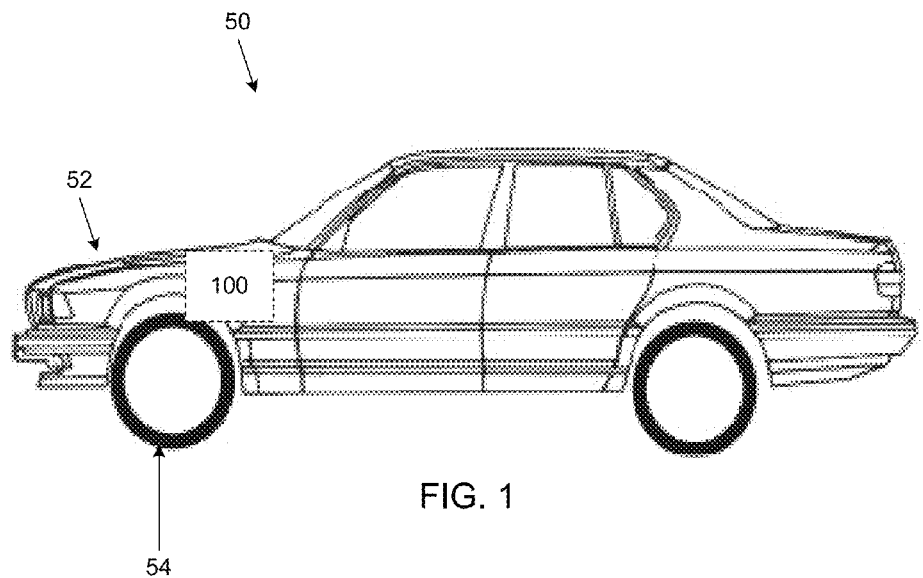
FIG. 1 is an example of a vehicle and a system for propelling the vehicle in accordance with some embodiments of the present invention.

FIG. 1 is an example of a vehicle 50 and a system 100 for propelling the vehicle in accordance with some embodiments of the present invention. The vehicle includes a body and at least one rotatable member configured to transport the body of the vehicle. It should be understood that the vehicle may be any mobile apparatus that may be propelled by at least one rotatable member. For example, the vehicle may be a car, truck, motorcycle, locomotive, boat, trailer, golf-cart, and the like.

For ease of illustration, the exemplary vehicle shown is a car 50. The car 50 includes a car body 52 and four rotatable members (e.g. wheels 54). The wheels 54 support and are configured to move the body 52 about.

It should be understood that the rotatable members of the vehicle should not be limited to the wheels 54, but may be other mechanisms which facilitate propelling of the vehicle, such as a propeller on an airplane or a motor on a boat. Thus, the rotatable members may be any device which is connected to a motorized apparatus to move the vehicle.

A system 100 is attached to the rotatable member and is configured to provide compressed air to a generator which will produce electricity to rotate the wheels 54, as will be discussed later.

Various embodiments of the system may be employed. For example, a generator system employing multiphase materials (MPM) may be used.

Figure 2:
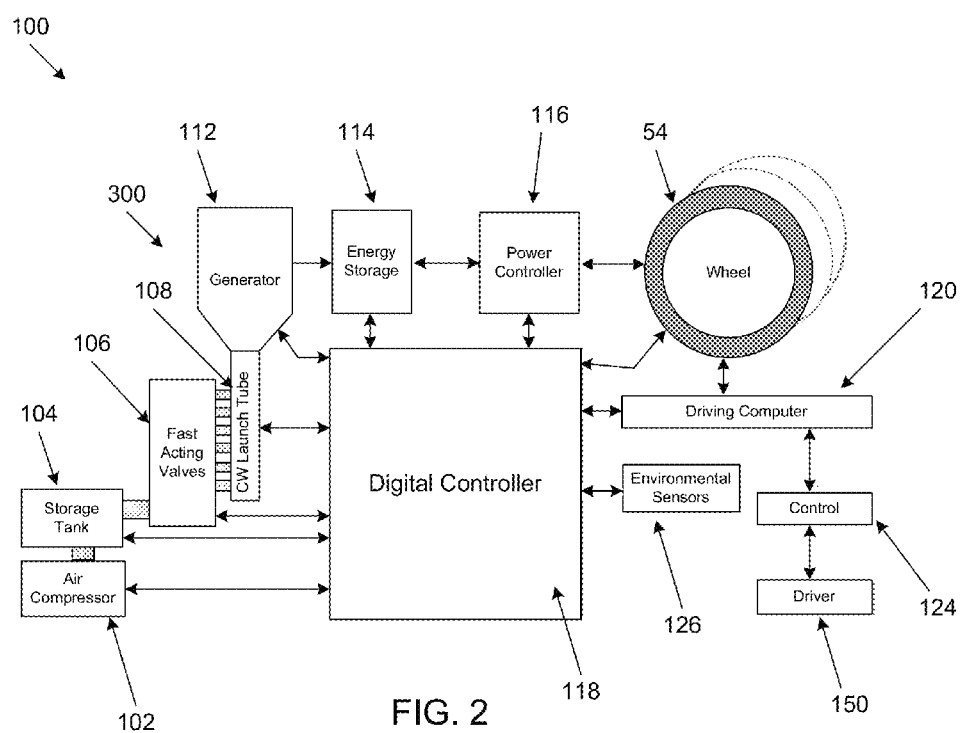
FIG. 2 is a block diagram of an example of the system of FIG. 1 in accordance with some aspects.

FIG. 2 is a block diagram of an example of the system 100 of FIG. 1 in accordance with some embodiments of the present invention. The system 100 may include one or more of the components described herein or may include more than the disclosed components. The exemplary system 100 illustrated in FIG. 2 includes an air compressor 102, a storage tank 104, fast acting valves 106, a launch tube 108, multiphase material (MPM) runners 110, 110', an electric generator 112, energy storage circuits 114, a power controller 116, a digital controller 118, a driving computer 120, an in-wheel based motor, a control interface 124 for the driving computer 120, and environmental sensors 126. These components are interconnected as illustrated in FIG. 2.

As a general overview of the energy process, according to some embodiments, MPM 107 is filled into launch tube 108. Compressed air, which is stored in a storage tank 104, is rapidly introduced into the launch tube 108 via the fast acting values 106. The air creates a shockwave, as soon as the MPM 107 begins to move the shockwave will be created which propagates up, along with the MPM 107, out from the base of the launch tube 108, and a depression wave is created which moves in the opposite direction, in the launch tube 108 causing the MPM 107 to rapidly move through the launch tube 108 toward the generator 112. Electrical energy is captured by the generator 112 and transferred to electronics for the car. After the MPM 107 has moved through the generator 112 or out of the generator 112, the MPM 107 is returned to a MPM reservoir or the MPM that is unusable is discarded. This above-described process overview is an example of a process of the present invention and it should be noted that various other steps and alternate steps may be included in this process. Below is a more detailed description of several aspects of the present invention.

A discussion of the parts of the generator system in some embodiments will now be discussed below with regard to FIGS. 2-3G.

Any kind of air compressor 102 may be employed in the system. In one embodiment it could be a piston compressor and in another it could be a screw type of compressor. The air compressor 102 stores gases in the storage tank 104 and pressurizes such storage tank 104 until the gas is ready to be delivered to the launch tube 108. In one embodiment, the air compressor 102 shall be mounted in the vehicle since it is an on board compressor, and thus, the air compressor 102 should be lightweight and high performance. The air compressor 102 is communicative with the digital controller 118 and the storage tank 104.

The storage tank 104 stores the compressed air and is communicative with the digital controller 118 and the fast-acting valves 106. The storage tank 104 may be manufactured from composite materials to maintain light weight and durability. To prevent the possibility of the storage tank exploding in case of impact or vehicle accident, the construction of the tank is configured to slowly relieve the pressure, rather than relieving the pressure at once and thus exploding.

The fast acting valves 106 receive compressed air from the storage tank 104 and act as a distributor to distribute compressed air into the generator 112 on a timed cycle. The operation of the fast acting valves 106 occurs rapidly to activate the MPM 107. For each timed cycle, the fast acting valves release compressed air into the cavity (equivalently the launch tube) holding the MPM. The release is sequential proceeding from the nozzle-end back toward the base of the cavity. The sequence is timed to hold the MPM beneath the acting valve in place. As the sequence proceeds toward the base of the cavity, the MPM above the acting valve is projected up through the nozzle carrying the kinetic energy that has been converted from the potential energy of the compressed air.

The releasing of air pressure into the launch tube 108 from the compressor 102 creates a shock wave throughout the launch tube and therefore MPM will be forced upwards out of the launch tube toward the generator 112 in a rapid fashion and a depression wave will be created. As the MPM travels up the launch tube, electrostatic energy is converted from the kinetic energy of the moving MPM which is eventually captured by the generator (as is discussed later).

Figure 3A:
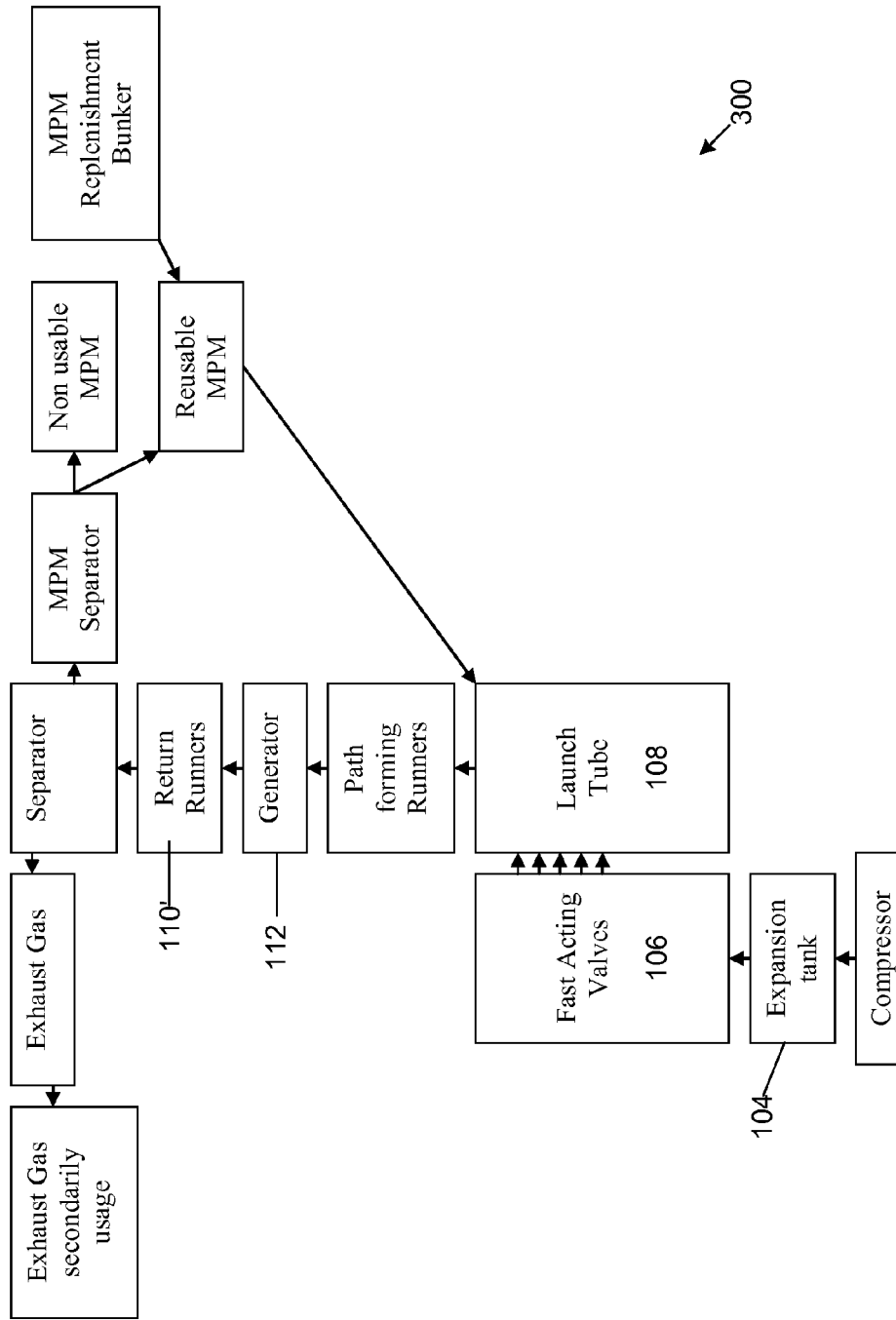
FIG. 3A is an example of a block diagram of a generator system in accordance with some aspects.
Figure 3B:
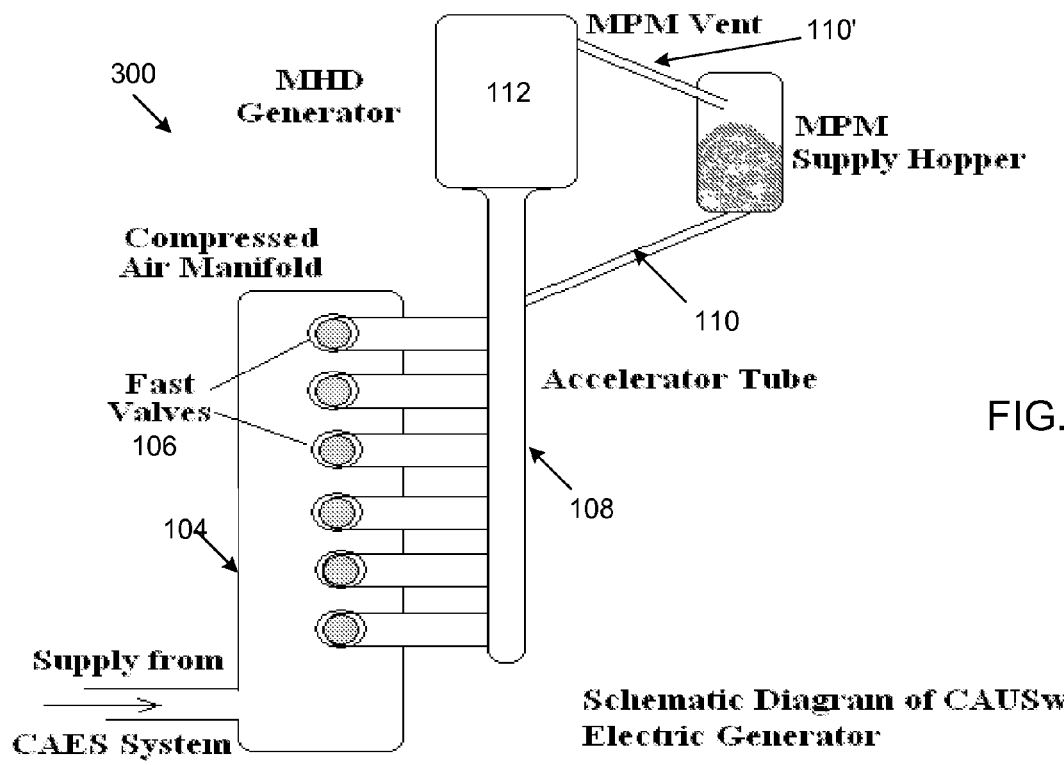
FIG. 3B is an example of a generator system in accordance with some aspects.
Figure 3C:
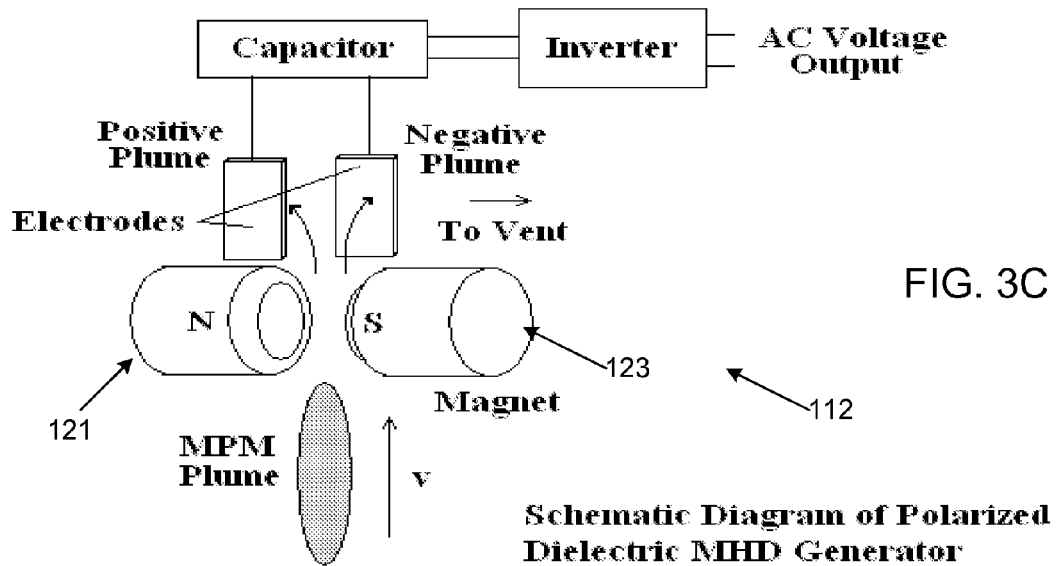
FIGS. 3C-3D are examples of a generator in accordance with some aspects.
Figure 3D:
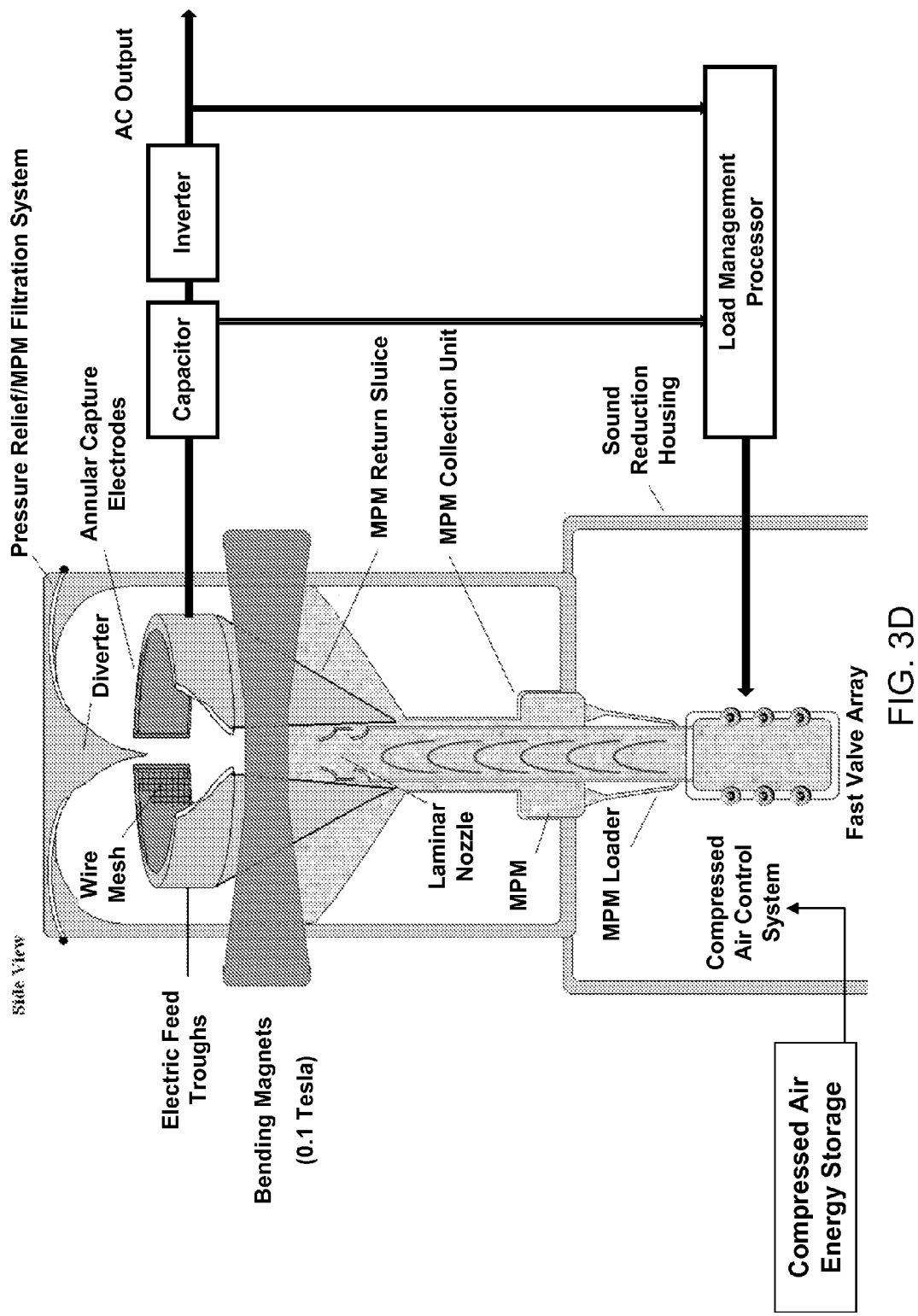
Figure 3E:
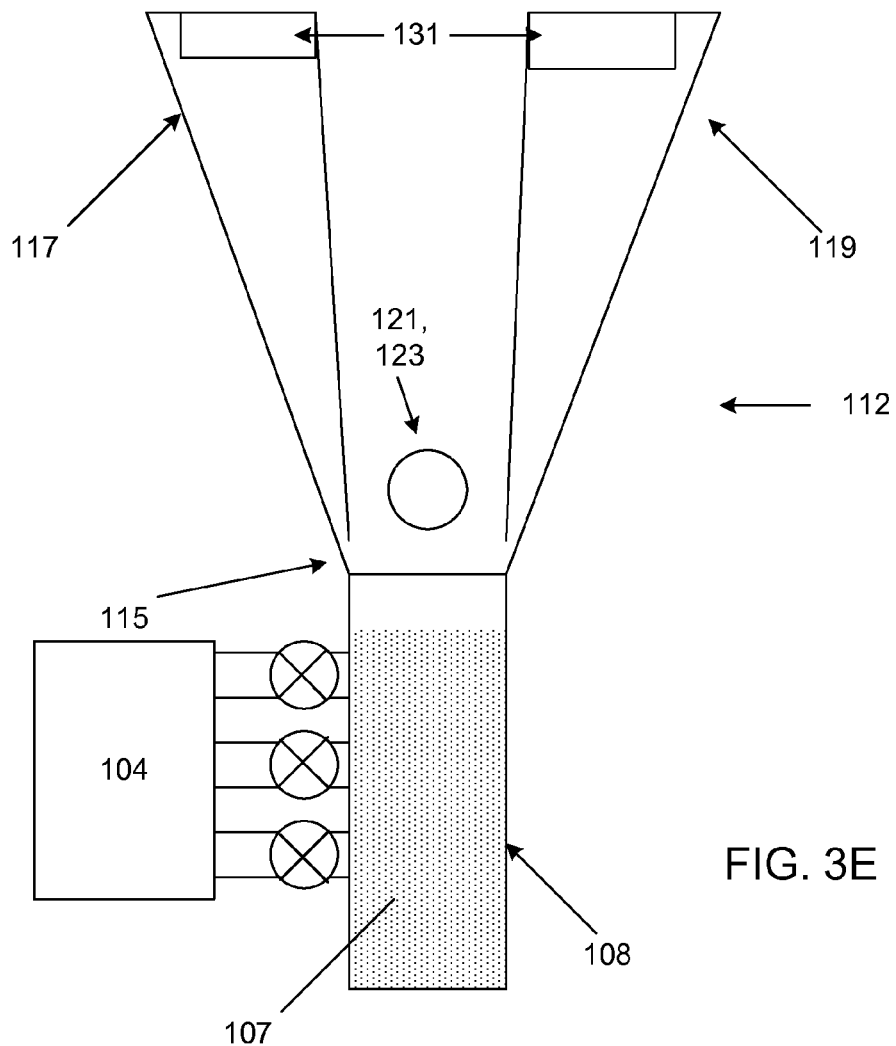
FIG. 3E is an example of a generator in accordance with some aspects.

An exemplary launch tube 108 that may be employed in the present invention is described in pending U.S. patent application Ser. No. 12/476,555, which is incorporated herein in its entirety by reference. As shown in FIG. 3E, the launch tube 108 may be any container which is capable of receiving and holding material (e.g. MPM) and capable of being pressurized. The launch tube 108 may be of any shape or size. For example, the launch tube 108 may be a cylindrical shape. At least a portion of the launch tube 108 is initially hollow. Any type of materials make up the body of the launch tube, including metals (e.g. steel, aluminum, etc.), plastic (e.g. PVC) and the like. In one embodiment, the launch tube 108 is a hollow pipe or a plastic tube. The launch tube 108 has at least one opening 108 to receive MPM and/or pressurized air/gas. For example, the launch tube 108 may have multiple openings to receive pressurized gas via the fast acting valves and the launch tube 108 may also have other openings to receive MPM 107, such as MPM from a reservoir and/or MPM which has been used and which is being returned to the launch tube 108 (via, for example, a valve).

The launch tube 108 may include a uniform flow system for creating a uniform flow of MPM 107. Such uniform flow system is located within the launch tube and creates a uniform laminar flow of MPM when the MPM reaches the generator 112. The system can be any apparatus system, such as a series of diffusers and effusers 113, as shown in FIG. 3G. These diffusers and effusers 113 create a Venturi effect on the MPM flow thereby causing the MPM to uniformly flow into the generator 112. In one embodiment, such effuser has a first opening and a second opening and a generally conical shape, whereby the surface area of the first opening and the surface area of the second opening are equivalent. This effuser guides the MPM through a magnetic field area created between two adjacent magnets according to various embodiment discussed in more depth later with regards to detailed descriptions of exemplary generators which may be employed.

The diffusers and effusers 113 direct the flow of MPM in such a way as to minimize the corrosive effect of MPM impacting the inner walls of the generator. The diffusers and effusers also decrease the turbulence and create a uniform laminar flow around the internal structures of the generator. The diffusers and effusers also decrease or eliminate the grouping effect of the MPM and focus the MPM in the central portion of the launch tube 108.

In some embodiments, the MPM 107 is any material having a multiphased composite structure (e.g., dielectric materials combined with gases, solids and/or gases and/or fluids, etc.). An example of such MPM includes a sand and gas mixture. Other examples of MPM materials include quartz, plastics, and the like mixed with materials having at least one different phase. In one embodiment, MPM includes any material which has a multiplicity of elements bonded together such that when such bond is broken energy is released. The MPM has porosity greater than 0 but less or equal to 1. At least a portion or all of an interior cavity of the launch tube 108 is filled with MPM.

In another embodiment, the MPM has other properties such as adsorption. In the presence of such properties, a breakage of the bond will occur on the material's surface only, but the mechanical structures could be intact and material would be used for a long time without replacement.

Figure 3F:
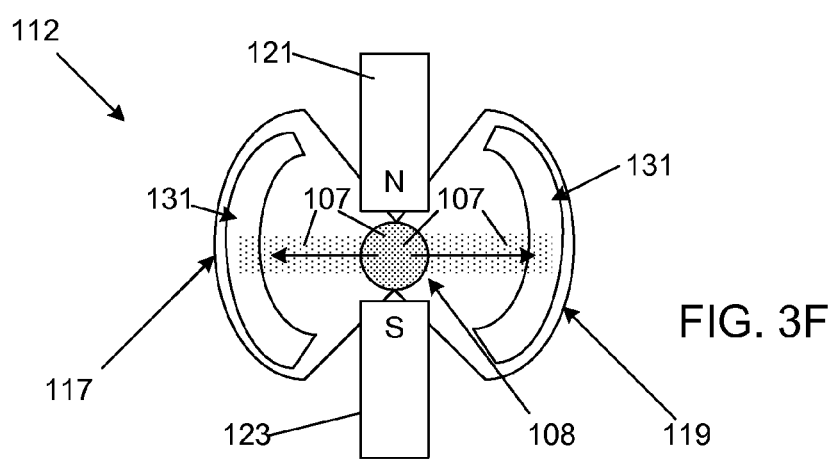
FIG. 3F is a top view of the generator of FIG. 1 in accordance with some aspects.
Figure 3G:
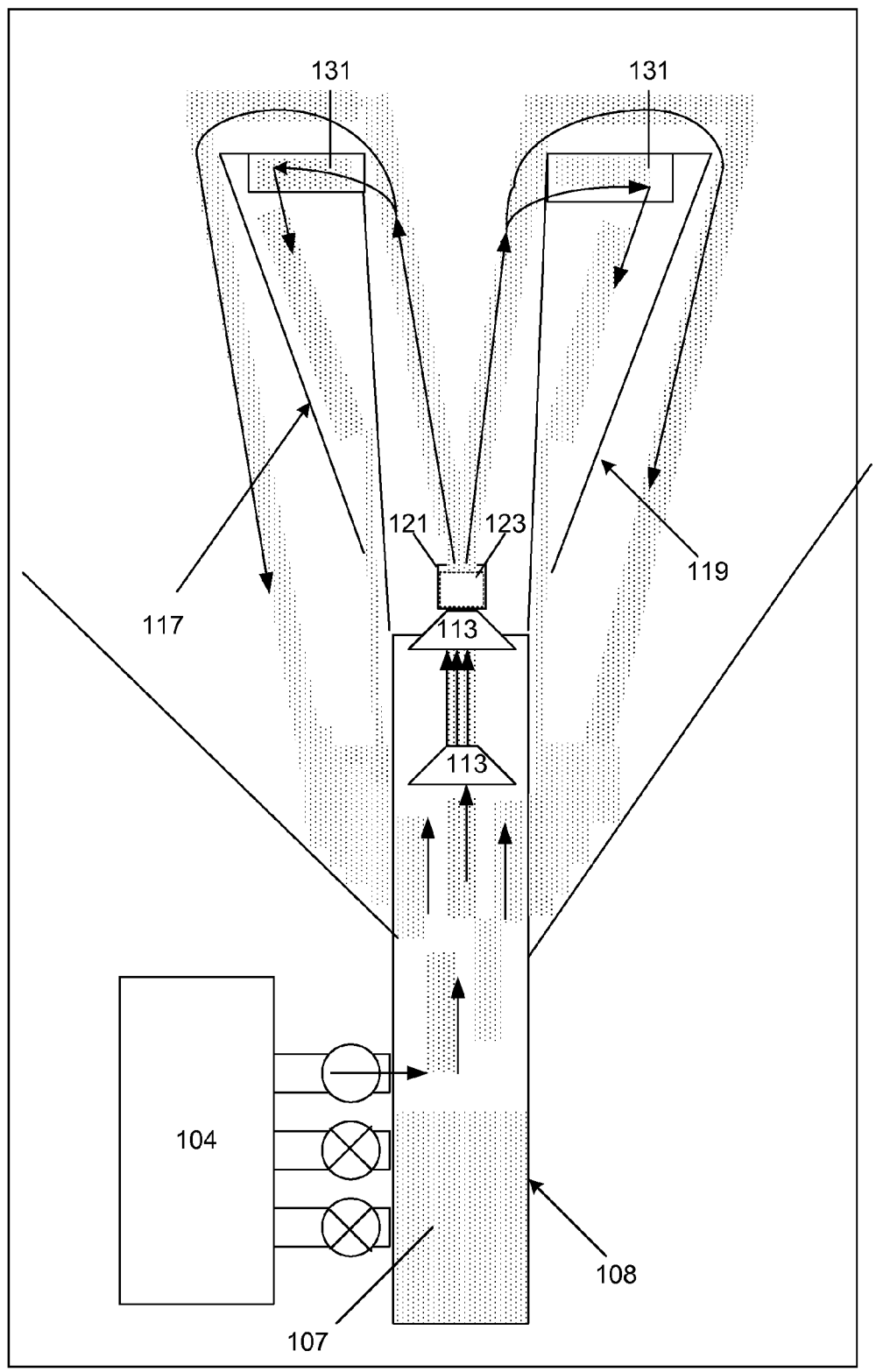
FIG. 3G is an example of a generator in operation in accordance with some aspects

As shown in FIGS. 3E and 3G, after MPM is placed in the launch tube 108 from the supply hopper or other source, the fast acting valves operate in a timed sequence using the compressed air from the storage tank 104. The sequential introduction of the compressed air generates a shock wave and in the opposite direction the depression wave, that imparts kinetic energy to the MPM material forcing the MPM through the launch tube at a rapid pace.

The runners 110, 110' are connected to the generator 112. The runners include a first set of runners 110 and a return set of runners 110'. These runners carry the MPM to and from the generator. The first set of runners 110 may be installed at the end of the launch tube 108, but before entrance to the generator 112. As previously discussed, compressed air forces the MPM through the launch tube and to the generator. For the return set of runners 110', these runners are installed after the generator onto the return path to the MPM supply hopper. The return runners form a return path after the MPM has traveled through the generator. The return runners 110' separate MPM and air, where the separated air is exhausted out of the system and the MPM is collected for next cycle.

The generator 112 may be any device which generates electrical energy based on MPM traveling through the generator 112. Various embodiments of the generators that may be employed are discussed later. For example, charged MPM may travel through the generator and electrodes of the generator may collect electrons and thus generate electrical power. Other examples are disclosed later. Nonetheless, after the generator captures electrical energy, such energy is transferred to electrical circuits, such as energy storage circuits.

The power produced by the generator is dependent upon the vehicle demand. As the driver accelerates or decelerates, the cycle time of the generator must be adjusted to maintain a steady source of current flowing to the previously described capacitor/regulator circuit. The timing of the generator cycle is regulated by the digital controller. The digital controller acts as the feedback loop from the driving computer, environmental sensors, and power controller balancing the needs of the vehicle against stored energy and then adjusting the generation of power by increasing or decreasing the cycle time of the fast acting valves. Inside the generator, the fast acting valves release compressed air into the cavity holding the MPM. The release is sequential proceeding from the launch tube (cavity) end closest to the generator back toward the other end of the launch tube. The sequence is timed to hold the MPM beneath the acting valve in place. As the sequence proceeds toward the base of the launch tube, the MPM above the acting valve is projected up through the launch tube and uniform flow system, such that the MPM carries kinetic energy that has been converted from the potential energy of the compressed air.

For the energy storage circuits 114, a DC/DC converter captures electrical energy produced from the generator 112 as well as any energy recovered by the vehicles braking system and stores such energy in the energy storage circuits 114. The energy storage circuits 114 may be any circuit capable of storage energy, such as but not limited to, a battery, fuel cell, compressed air and any other means for storing electrical energy. However since the majority of the vehicle's energy store is in the form of compressed air, these other means of energy storage are much smaller than those found in other designs. In the Car application, DC energy will be produced and an Up Convertor will be used to convert to higher DC voltage, a standard DC/DC. For other applications of the generator AC may be required and a DC/AC convertor will be used. An example would be providing electricity to the power distribution grid requiring synchronization in both phase and frequency.

For the power controller 116, a CMOS and/or other circuitry include two-way circuits allow energy to be transferred to a motor that is connected to the wheel 54. The motor will be discussed in more depth later. The CMOS and/or other circuitry may also recover electrical energy when the wheel is not being powered. In one embodiment, the circuits control the digital motor with circuits and torque sensors. These circuits are not only able to transfer energy from the storage capacitor (e.g., battery) to power the motor but also allow for transferring of energy back into the storage capacitor during deceleration or idleness of the motor. Thus, recuperation of the energy is possible when the motor is not powered.

The digital controller 118 is the main controller that allows control of all essential circuits and allows for maintaining synchronization and smooth energy flow throughout the system 100. System reliability will be enhanced by incorporating component and subsystem redundancy and taking advantage of the inherent decrease in the probability of system failure that comes with parallel circuitry design. "Watch-dog" elements will be used to monitor for component or subsystem failure and automatically shift to the failing item's parallel backup. Such systems and subsystems will be processor driven and all inter-data exchange mechanisms will be incorporated herein.

The digital controller 118 controls the generator and synchronizes the charging cycles with the discharging process. Another function of this controller 118 is to convert mechanism directions from an operator 150 of the system 100 into the control signals and sequences of the entirely system 100.

The driving computer is basically a microprocessor-controlled unit that allows the vehicle to be a "Drive by Wire" car. As the operator adjusts the vehicle's controls, these input devices ("Gas pedal", brakes, steering, etc) instruct the driving computer to make demands of the digital controller which in turn adjust the generator cycle timing, energy recovery braking systems and perhaps even the ventilation fans so that extra power is available during maximum acceleration. The driving computer processes and compares data from the driving media (wheel 54) and from controls 124 (basically from the driver 150) which demands more power (acceleration), less power (deceleration), or a complete stop with a variety of time domain variables. This compared data will initially develop a single "demand" streaming, where the Digital Controller 118 will take that stream under consideration to control and plan the power plant demand and storage.

An in-wheel based motor (not shown) may be a relatively reliable motor. Rather than transferring energy through moving parts of a fossil fuel motor, such as via gears, pistons, etc., electricity generated in the present generator 112 will be transferred to motors in each wheel. In one embodiment, the system 100 may include a complete and integrated digital control with heat prevention circuits and air suspended bearing system. In another embodiment, the wheel based digital motor may be a dual-purpose step motor, where, when it is desired to slow the vehicle, the circuit is switched so that the stator coils of the motor act as an electric generator. The resulting counter electromotive force will not only bring the vehicle to a stop, but also convert the kinetic energy of the vehicle back into electrical energy that can be recovered and stored in the Energy Storage system 114 as previously described. Instead of using a gear and transmission system, where the efficiency would be diminished by friction and heat, an innovative way is used to connect a direct drive motor which will build as an integrated element of the wheel 54. Such design would avoid any friction related to the gears and shifting mechanism, constant lubrication and heat dissipation. In gear driven systems, barely 30% efficiency would be reached due to mechanical friction. The modern systems, with full synthetic oil lubrication, come close to 60% efficiency barrier. The present system may not have any intermediate gears and shift mechanisms, lubrication and associated efficiency loss or weight and heat dissipation. An example of a motor would be a rim-built motor with a ball bearing wheel suspension.

Environmental sensors 126 may collect all or most of the environmental parameters such as temperature, humidity, driving conditions, elevation, etc., for optimizing the process of producing, storing and using of electrical energy. Sensors provide current environment observations, include the driving conditions. Most crucial environment parameters will be entered to the system 100 for further calculation and considerations for optimization and control of the whole driving train.

Various embodiments of the generator 112 will now be described. Three exemplary embodiments of such generator system may be employed and are described herein:

1) A magneto-hydrodynamic generator employing a permanent or temporary magnet and dielectric MPM; 2) a generator employing coils and magnetically soft MPM; and 3) a generator employing coils and permanently magnetic MPM. It should be understood that various other embodiments of generator systems using MPM are well within the scope of the present disclosure. Each of these systems is described below. It should be noted that examples of an electric generator that may be employed in the present invention is described in U.S. Provisional Patent Application No. 61/110,737 and 61/170, 869, which are both incorporated in their entirety herein by reference.

Magneto-Hydrodynamic Generator Employing a Permanent or Temporary Magnet and Dielectric MPM According to one embodiment, the electric generator system 300 may include two opposing portions 117, 119. The base 115 of the electric generator is attached to the end of the launch tube 108 and the two opposing portions extend conically outwards from the generator base. The generator also includes two magnets (i.e., a north pole 121 and a south pole 123), as illustrated best in FIGS. 3C, 3E and 3F. These magnets 121, 123 may be two separate magnets or opposing ends of a single magnet. Regardless, these magnets 121, 123 are positioned at the base of the generator 112 and directly above the end of the launch tube 108. The uniform flow of MPM travels between the two magnets 121, 123 such that the MPM is exposed to magnetic field. This causes the MPM to split into two directions perpendicular to the direction of the magnetic field, as illustrated in FIG. 3F.

As a general overview, the electric generator 112 converts electrostatic energy and/or kinetic energy of the moving MPM into electric energy when the MPM is released from the launch tube. To do this, the generator 112 includes a mesh and an electrode (collectively shown as element 131) at the end of each of the two opposing portions 117, as illustrated in FIG. 3E. As the electro-charged MPM passes proximate to the mesh and electrodes 131, the MPM is attracted into the mesh and the ionized electrodes pass into the electrode which is then passed to electrical circuitry. The electrostatic energy is then released from the MPM and then the used MPM is then returned to a MPM supply hopper for reuse. Thus, electrical power is generated from applying pressurized gas to MPM in the launch tube.

As previously discussed, the MPM may consist of a fine grain dielectric material that due to its insulative properties will develop an electric charge as it is fired from the launch tube, as discussed above. In this manner, the uniform flow system (e.g., a series of interlocking nozzles) direct the MPM in such a way as to optimize the conversion of MPM kinetic energy to DC charge by increasing dramatically the ionization of the dielectric MPM material. Furthermore, as previously discussed, the uniform flow system is designed to direct the flow of MPM in such a way as to minimize the corrosive effect of MPM impacting the inner walls of the generator. Depending upon the electronegativity of the material, this uniform flow system will cause a sizable fraction of the MPM to develop a positive charge while an equal fraction will be negatively charged.

As shown in FIGS. 3C-3G, a "plume" of charged MPM enters the magnetic field provided by a magnet, such as a strong Neodymium rare earth magnet. The particles experience a force described by the following Lorentz Equation, $$\vec{F} = q\vec{v} \times \vec{B}$$

Here q is the charge, $\vec{v}$ is the velocity vector, and $\vec{B}$ is the magnetic field vector. This force steers positive and negative charges in opposite directions to where they are collected by electrodes placed at right angles to the field and velocity vectors. The surface charge density σ produced by this force yields an electrical potential given by $$V = \frac{2\sigma d}{\varepsilon_0}$$

where d is the electrode separation and $\varepsilon_0$ is the permittivity of free space, a constant that yields electric field strength. As this electric field builds in intensity, the charged MPM slows, effectively converting its kinetic energy into electrical energy that is stored in the capacitor shown. This energy, once conditioned by the regulator is then used to power the vehicle motor and electronics as with the previous generator.

Generator Employing Coils and Magnetically Soft MPM

As previously mentioned, the generator 112 previously described is not the only generator that may be employed to generate electrical energy. Indeed, various other generator systems may be employed.

An alternate generator system 400 that may be used in place of the above-described generator 112 is now described. The now-described generator system employs temporarily magnetic MPM. Such temporarily magnetic MPM consists of ferromagnetic material with a high magnetic susceptibility but low retentivity, such as a "soft" iron alloy (e.g., "soft" iron, or other material which can be magnetized using an electromagnet).

The temporarily magnetic MPM is placed in a launch tube and launched out of the launch tube. The temporarily magnetic MPM is called a "plume" of temporarily magnetic MPM.

Figure 4A:
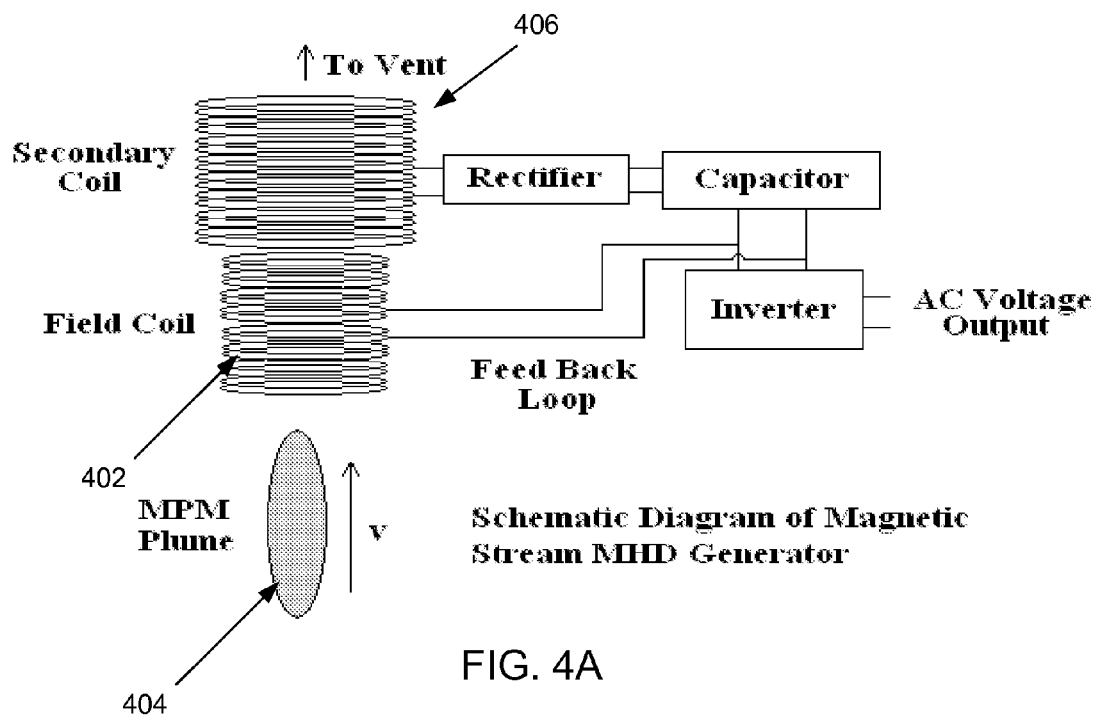
FIGS. 4A and 4B illustrate other examples of generators in accordance with some aspects.
Figure 4B:
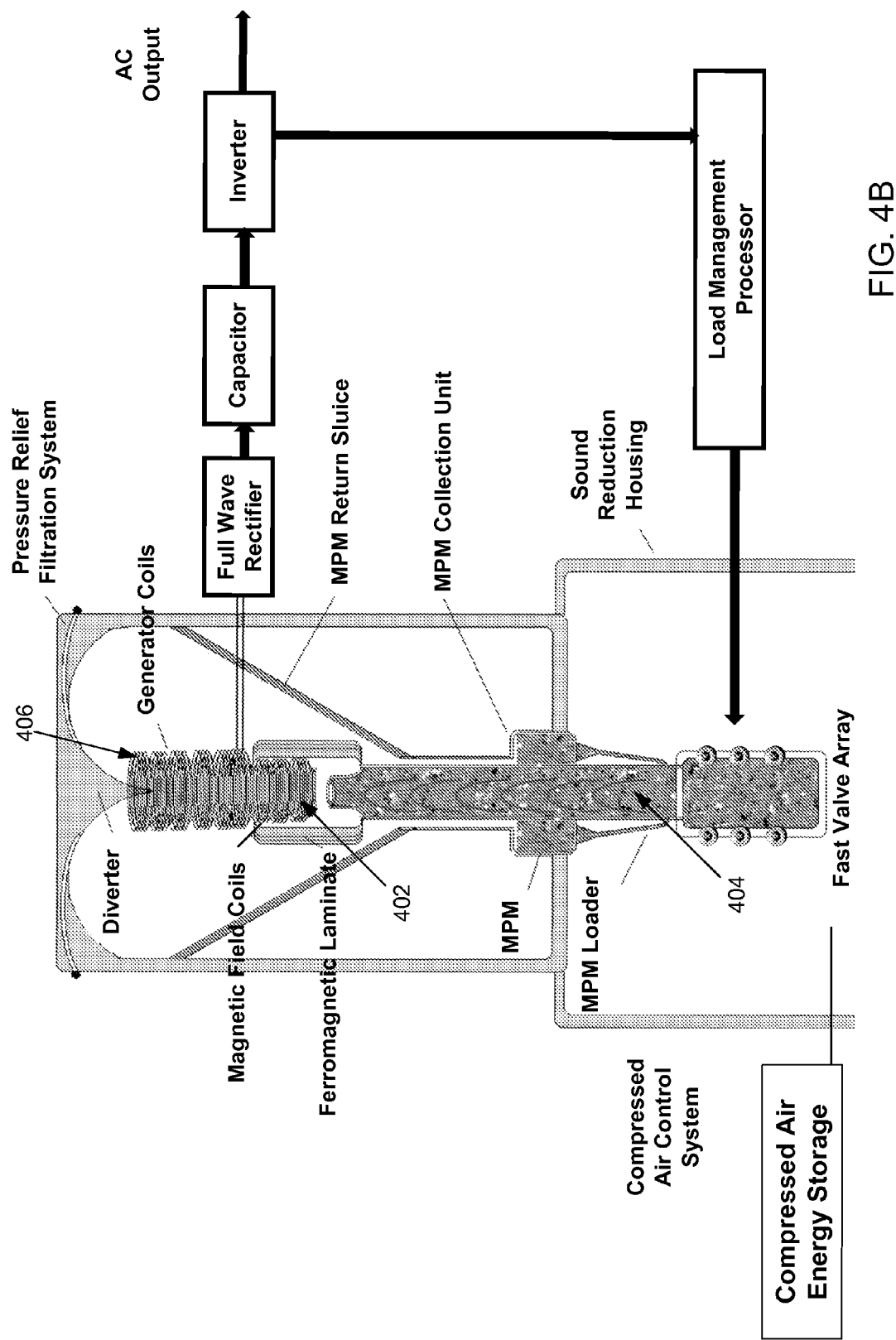

As shown in FIGS. 4A and 4B, this "plume" of temporarily magnetic MPM passes through a field coil 402 that aligns the dipole moment of each MPM particle, thereby creating a polarized magnetic "fluid" 404, which becomes a plume of magnetized material. This magnetic "fluid" 404 continues through a secondary coil 406 where an electromotive force is generated in accordance with Faraday's Law of Electromagnetic Induction. In some embodiments, the field coil 402 and secondary coil 406 are each a series of windings of an electrical wire about a central point. The secondary coil 406 may have more windings of coils than the field coils 402 according to some embodiments. Furthermore, in another embodiment there could be used an additional controller for the field coil 402 (not shown).

Figure 5:
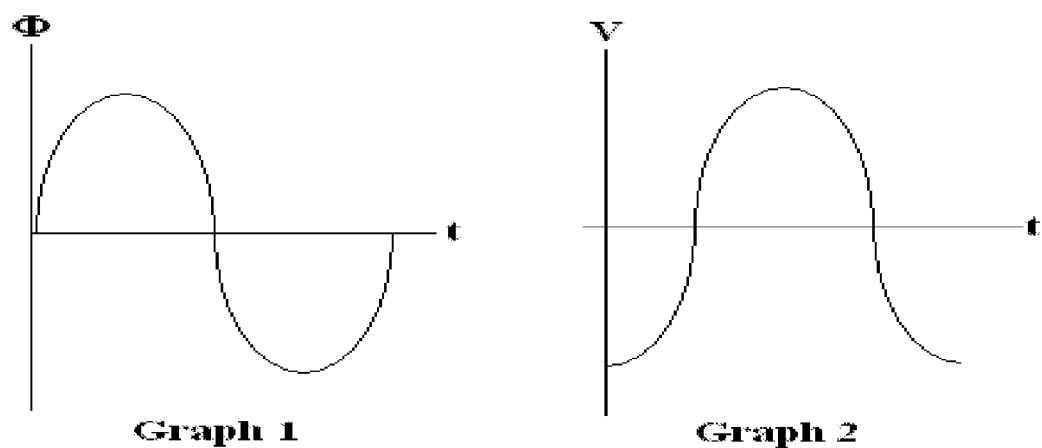
FIG. 5 is a graph of signals generated by the generator of FIG. 4A.

Nonetheless, a sinusoidal pulse of current is generated in the secondary coil (See FIG. 5) when the plume of magnetized MPM travels through and such pulse is directed through a rectifier to a capacitor to store the electrical energy produced.

It is noted that, in an embodiment where the launch tube requires a time interval to be "reloaded" with MPM, the voltage in the secondary coil is not generated continuously. However, it is within the scope of this application that a continuous voltage signal may be generated in the event that multiple launch tubes are employed where some launch tubes activate when other launch tubes are being reloaded. Additionally, a continuous reloading process is also contemplated in the present invention where MPM is continuously filling the launch tube and is continuously shooting MPM (either dielectric or magnetic MPM) through the generator.

Nonetheless, the MPM, as its kinetic energy is converted into electrical energy, slows and is captured by a venting system. From there, gravity allows the MPM to flow back into the supply hopper, as previously discussed. In addition, a positive feedback can be established by connecting the capacitor to the field coil, thereby increasing the magnetization of the MPM. A helpful analogy to understanding this process is the common automotive alternator. Currently, the battery establishes a magnetic field in a series of coils inside the housing of the alternator. The rotor, spun by the engine's drive belt, moves through this field and produces a current that then flows back into the battery, thus raising the overall efficiency of the device.

In effect, the secondary coils become the generator of the system such that when the magnetized MPM enters the secondary coils, electrical current is generated and captured.

Generator Employing Permanent Magnetic MPM

In another alternate embodiment, a generator using a permanent-magnetic MPM (instead of or in addition to the temporary-magnetic MPM), may be employed as a generator 112 for the overall generator system 300. The permanent-magnetic MPM includes permanent magnet materials that generate a magnetic field. Using such permanent-magnetic MPM eliminates or minimizes the need for field coil 402 to magnetize the MPM plume. It is noted that the permanent-magnetic MPM may be used in combination with the temporary-magnetic material and does not have to be limited to homogenous magnetic materials.

Regardless, the generator 112 using a permanent-magnetic MPM operates the same as the above-described generator system using temporary-magnetic material except that the field coils are an optional portion of the system. For example, a plume of permanent-magnetic MPM is launched from the launch tube of the previously described systems and into the secondary coils of FIG. 4 without traveling through the field coil. In one embodiment, the permanent-magnetic MPM plume travels through the field coil to magnetize any magnetizable material, as desired. As the permanent-magnetic MPM plume travels through the field coil 402, an electrical current is produced and electrical power is received and utilized or stored, as previously discussed.

Other embodiments of an electrical generator that uses MPM may be employed and the present application should not be limited by the embodiments disclosed herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the disclosure has other applications in other environments. This application is intended to cover any adaptations or variations of the present disclosure. The following claims are in no way intended to limit the scope of the disclosure to the specific embodiments described herein.

What is claimed is:

1. An apparatus, comprising:
   a vehicle comprising a generator system and a member for moving the vehicle about, the moving member being connected to and receiving energy from the generator system,
   wherein the generator system employs multiphase materials (MPM) and compressed air to convert kinetic energy into electrical energy,
   wherein the MPM comprises a multiphased composite structure comprising a multiplicity of elements bonded together.

2. The apparatus of claim 1, wherein the generator system comprises a launch tube and an air manifold, the air manifold configured to deliver the compressed air to the launch tube.

3. The apparatus of claim 2, wherein the launch tube comprises a hollow structure capable of receiving the MPM and the compressed air.

4. The apparatus of claim 2, wherein the generator system further comprises an air compressor to deliver the compressed air to the launch tube.

5. The apparatus of claim 2, wherein the generator system further comprises fast acting valves for introducing the compressed air into the launch tube on a timed basis.

6. The apparatus of claim 2, wherein the generator system further comprises control electronics for delivering the electrical energy to the moving member for moving the vehicle.

7. The apparatus of claim 2, wherein the generator system further comprises a generator that receives the MPM, capturing electrical energy and transferring the electrical energy to electronics of the vehicle.

8. The apparatus of claim 7, wherein the generator system further comprises a reservoir to receive the MPM after the MPM has been received by the generator, the reservoir being connected with the launch tube so that the MPM can be reused in the generator system.

9. The apparatus of claim 1, wherein the vehicle comprises a car and the moving member comprises a wheel of the car.

10. The apparatus of claim 1, wherein the vehicle comprises one of a car, truck, motorcycle, locomotive, boat, trailer, or golf-cart.

11. The apparatus of claim 1, wherein the MPM comprises a sand and gas mixture.

12. A method for operating a vehicle having a generator system that employs multiphase materials (MPM), the method comprising:
   providing the MPM to a launch tube connected with a storage tank of compressed air and a generator of the generator system; and
   delivering the compressed air from the storage tank to the launch tube of sufficient force to allow the MPM to move out of the launch tube into the generator;
   wherein the MPM comprises a multiphased composite structure comprising a multiplicity of elements bonded together;
   wherein the generator is configured to receive the MPM, thereby capturing electrical energy and transferring the electrical energy to electronics of the vehicle.

13. The method of claim 12, wherein the delivering compressed air to the launch tube comprises delivering compressed air via fast-acting valves in a timed fashion.

14. The method of claim 12, wherein the generator is configured to transfer the electrical energy to an energy storage member.

15. The method of claim 12, wherein the generator is configured to transfer the electrical energy to a power controller, the power controller configured to deliver power to an axle of a wheel of the vehicle so that the wheel will rotate thereby moving the vehicle.

16. A vehicle comprising:
   a generator system and a rotatable member for moving the vehicle, the generator system comprising:
   a launch tube comprising a first end and a second end;

a generator connected to a first end of the launch tube;

a delivery system configured to deliver multiphase materials (MPM) through the launch tube to the generator, wherein the MPM comprises a multiphased composite structure comprising a multiplicity of elements bonded together; and a connection system connecting the generator with the rotatable member of the vehicle, wherein the generator employs the MPM and compressed air to produce electrical energy and transfer the electrical energy to the rotatable member of the vehicle.

17. The vehicle of claim 16, wherein the delivery system comprises an air manifold, a reservoir of compressed air, and fast-acting valves, the air manifold connecting the compressed air reservoir to the launch tube so that the compressed air reservoir can deliver the compressed air to the launch tube via the fast-acting valves.

18. The vehicle of claim 16, wherein the MPM comprises a sand and gas mixture.

19. A vehicle comprising:

a generator system and a rotatable member for moving the vehicle, the generator system comprising:

a launch tube; and a generator connected with the launch tube and a storage tank of compressed air, the generator using multiphase materials (MPM) and the compressed air to convert kinetic energy of the MPM into electrical energy, wherein the MPM comprises a multiphased composite structure comprising a multiplicity of elements bonded together, wherein the generator comprises:

secondary coils that generate electrical power when the MPM travels proximate to the secondary coils.

20. The vehicle of claim 19, wherein the MPM comprises soft magnetic material.

21. The vehicle of claim 19, wherein the generator further comprises field coils to magnetize the soft magnetic material prior to the soft magnetic material traveling proximate to the secondary coils.

22. The vehicle of claim 19, wherein the MPM comprises permanent magnetic material and wherein the secondary coils produce electrical power when the permanent magnetic material travels through the secondary coils.

23. A method for operating a vehicle having a generator system that employs multiphase materials (MPM), wherein the MPM comprises a multiphased composite structure comprising a multiplicity of elements bonded together, the method comprising:

filling a launch tube with the multiphase material (MPM), the launch tube being connected with a generator and a storage tank of compressed air; and presenting the compressed air into the launch tube to launch the MPM out of the launch tube into the generator, the generator converting kinetic energy into electrical energy, wherein the generator comprises:

a magnet to direct the MPM to electrodes of the generator, the electrodes attracting ionized particles from the MPM when the MPM passes proximate to the electrodes, secondary coils that generate electrical current when the MPM travels proximate to the secondary coils.

24. The method of claim 23, wherein the MPM comprises soft magnetic material and wherein the generator further comprises field coils to magnetize the soft magnetic material prior to traveling proximate to the secondary coils.

25. The method of claim 23, wherein the MPM comprises soft magnetic material and wherein the generator further comprises field coils to magnetize the soft magnetic material prior to traveling proximate to the secondary coils.

26. The method of claim 23, wherein the MPM comprises permanent magnetic material.

* * * * *